(12) United States Patent
Urai et al.

(10) Patent No.: US 7,696,127 B2
(45) Date of Patent: Apr. 13, 2010

(54) EXHAUST GAS PURIFYING CATALYST

(75) Inventors: Tomoaki Urai, Hiroshima (JP);
Tomohiro Honda, Hiroshima (JP);
Katsuaki Kurata, Hiroshima (JP);
Hideharu Iwakuni, Hiroshima (JP);
Akihide Takami, Hiroshima (JP)

(73) Assignees: Toda Kogyo Corporation (JP); Mazda Motor Corporation (JP)

( * ) Notice: Subject to any disclaimer, the term of this patent is extended or adjusted under 35 U.S.C. 154(b) by 581 days.

(21) Appl. No.: 11/646,398

(22) Filed: Dec. 28, 2006

(65) Prior Publication Data
US 2007/0167320 A1    Jul. 19, 2007

(30) Foreign Application Priority Data
Jan. 13, 2006    (JP)    ............... 2006-006341

(51) Int. Cl.
B01J 23/10    (2006.01)
B01J 23/00    (2006.01)
B01J 23/02    (2006.01)
B01J 23/40    (2006.01)
B01J 23/42    (2006.01)
B01J 21/04    (2006.01)

(52) U.S. Cl. ............... 502/326; 502/304; 502/349; 502/439; 502/527.19

(58) Field of Classification Search ............... 502/304, 502/349, 439, 527.19, 326
See application file for complete search history.

(56) References Cited

U.S. PATENT DOCUMENTS

| | | | |
|---|---|---|---|
| 4,927,799 A * | 5/1990 | Matsumoto et al. | 502/303 |
| 4,957,896 A * | 9/1990 | Matsumoto et al. | 502/304 |
| 5,015,617 A * | 5/1991 | Ohata et al. | 502/304 |
| 5,075,276 A * | 12/1991 | Ozawa et al. | 502/304 |
| 5,260,249 A * | 11/1993 | Shiraishi et al. | 502/304 |
| 5,318,757 A * | 6/1994 | Abe et al. | 422/174 |

(Continued)

FOREIGN PATENT DOCUMENTS

EP    0778071    6/1997

(Continued)

OTHER PUBLICATIONS

C.E. Hori et al., "Thermal stability of oxygen storage properties in a mixed CeO$_2$.ZrO$_2$ system", Applied Catalysis, vol. 16, No. 2, pp. 106-117, Mar. 27, 1998, XP002257397.

*Primary Examiner*—Cam N Nguyen
(74) *Attorney, Agent, or Firm*—Studebaker & Brackett PC; Donald R. Studebaker (57) ABSTRACT

Disclosed is an exhaust gas purifying catalyst, which comprises a CeZr-based composite oxide capable of maintaining a hollow structure to ensure an oxygen absorbing/releasing capability, even after being exposed to high-temperature exhaust gas. The exhaust gas purifying catalyst comprises a honeycomb-shaped substrate, and a catalyst layer formed on a surface of the substrate. The catalyst layer contains a composite oxide which includes cerium (Ce) and zirconium (Zr) and has a hollow structure, and a catalytic metal supported by the composite oxide. The composite oxide having the hollow structure includes, in a state after being subjected to a thermal aging in Air at 1000° C. for 24 hours, a particle with a shape having an outer diameter of 750 to 1000 nm and a shell thickness of 80 to 120 nm.

3 Claims, 7 Drawing Sheets

U.S. PATENT DOCUMENTS

| | | | |
|---|---|---|---|
| 5,532,198 A * | 7/1996 | Chopin et al. | 502/304 |
| 5,607,892 A * | 3/1997 | Chopin et al. | 502/304 |
| 5,945,369 A * | 8/1999 | Kimura et al. | 502/304 |
| 5,948,377 A * | 9/1999 | Sung | 423/213.5 |
| 5,958,827 A | 9/1999 | Suda et al. | |
| 5,986,152 A * | 11/1999 | Muller et al. | 570/243 |
| 6,004,525 A | 12/1999 | Tani et al. | |
| 6,150,288 A | 11/2000 | Suzuki et al. | 501/105 |
| 6,171,572 B1 * | 1/2001 | Aozasa | 423/594.12 |
| 6,180,075 B1 * | 1/2001 | Lindner et al. | 423/213.2 |
| 6,221,805 B1 | 4/2001 | Yamashita et al. | |
| 6,248,688 B1 * | 6/2001 | Wu et al. | 502/302 |
| 6,306,794 B1 * | 10/2001 | Suzuki et al. | 502/304 |
| 6,335,305 B1 * | 1/2002 | Suzuki et al. | 502/325 |
| 6,413,483 B1 * | 7/2002 | Brisley et al. | 423/239.1 |
| 6,528,451 B2 * | 3/2003 | Brezny et al. | 502/304 |
| 6,569,392 B1 * | 5/2003 | Li et al. | 423/213.5 |
| 6,576,207 B1 * | 6/2003 | Mussmann et al. | 423/212 |
| 6,677,272 B2 * | 1/2004 | Beall et al. | 502/439 |
| 6,852,665 B2 * | 2/2005 | Morikawa et al. | 502/304 |
| 6,897,182 B2 * | 5/2005 | Cutler et al. | 502/302 |
| 7,223,715 B2 * | 5/2007 | Terashima et al. | 502/339 |
| 7,265,076 B2 * | 9/2007 | Taguchi et al. | 502/326 |
| 7,287,370 B2 * | 10/2007 | Rajaram et al. | 60/274 |
| 7,307,039 B2 * | 12/2007 | Iwakuni et al. | 502/304 |
| 7,323,432 B2 * | 1/2008 | Niihara et al. | 502/300 |
| 7,341,975 B2 * | 3/2008 | Iwakuni et al. | 502/326 |
| 7,547,656 B2 * | 6/2009 | Miura | 502/327 |
| 2002/0081255 A1 * | 6/2002 | Cutler et al. | 423/213.5 |
| 2002/0160912 A1 | 10/2002 | Morikawa et al. | |
| 2004/0042939 A1 * | 3/2004 | Rajaram et al. | 422/180 |
| 2004/0048741 A1 * | 3/2004 | Poulston et al. | 502/302 |
| 2004/0151645 A1 * | 8/2004 | Li | 423/213.5 |
| 2006/0019824 A1 * | 1/2006 | Miyoshi et al. | 502/304 |
| 2006/0059900 A1 * | 3/2006 | Harada et al. | 60/297 |

FOREIGN PATENT DOCUMENTS

| | | |
|---|---|---|
| EP | 1657219 | 5/2006 |
| EP | 1669135 | 6/2006 |
| JP | 09-155192 | 6/1997 |
| JP | 09-221304 | 8/1997 |
| JP | 11-019514 | 1/1999 |
| JP | 11-116211 | 4/1999 |
| JP | 11-314035 | 11/1999 |
| JP | 2000-007309 | 1/2000 |
| JP | 2000-203830 | 7/2000 |
| JP | 2001-347167 | 12/2001 |
| JP | 2002-001120 | 1/2002 |
| JP | 2002-248347 | 9/2002 |
| JP | 2004-016838 | 1/2004 |
| JP | 2004-275919 | 10/2004 |
| JP | 2005-334791 | 12/2005 |
| WO | WO 01/36332 | 5/2001 |
| WO | WO 03/070640 | 8/2003 |
| WO | WO 2004/005184 | 1/2004 |

* cited by examiner

| | BET specific surface area (m²/g) | | Decreasing rate(%) 100*(A-B)/A | Post-aging shape | |
|---|---|---|---|---|---|
| | Fresh state (A) | Post-aging state (B) | | Average outer diameter (nm) | Average shell thickness (nm) |
| Inventive Example 1 | 88.7 | 15.0 | 83.0 | 950 | 100 |
| Inventive Example 2 | 83.9 | 16.2 | 80.7 | 800 | 100 |
| Comparative Example | 123.6 | 8.9 | 92.8 | 360 | 40 |

EXHAUST GAS PURIFYING CATALYST

BACKGROUND OF THE INVENTION

1. Field of the Invention

The present invention relates to an exhaust gas purifying catalyst adapted, for example, to be mounted in an exhaust pipe of a vehicle, and more specifically to an exhaust gas purifying catalyst comprising a catalyst layer formed on a surface of a honeycomb-shaped substrate in a manner that it contains a composite oxide which includes cerium (Ce) and zirconium (Zr) and has a hollow structure, and a catalytic metal supported by the composite oxide.

2. Description of the Related Art

As is commonly known, an air-fuel ratio of exhaust gas discharged from an engine is varied depending on engine operation states, such as acceleration, deceleration and steady states, and, in general, hydrocarbon (HC), carbon monoxide (CO) and nitrogen oxides (NOx) contained in the exhaust gas can be simultaneously converted only in a certain limited range around a theoretical air-fuel ratio of 14.7. As one technique of allowing an air-fuel ratio during acceleration or deceleration to fall with the purifying range, there has been known a technique of incorporating an oxygen-absorbing material into an exhaust gas purifying catalyst. This oxygen-absorbing material is operable, when oxygen in exhaust gas is in an excess state (lean air-fuel ratio), to absorb and store oxygen, and, when oxygen in exhaust gas is in a deficient state (rich air-fuel ratio), to release the oxygen stored therein, so as to allow the lean and rich air-fuel ratios to fall within the conversion range.

$CeO_2$ (ceria) is known as one of the oxygen-absorbing materials. If $CeO_2$ is used by itself, a specific surface area thereof is reduced when being exposed to heat of exhaust gas, and an oxygen absorbing/releasing capability will deteriorate due to change in properties thereof. For this reason, a composite oxide, such as CeZr-based composite oxide containing $ZrO_2$ (zirconia), is known, and a catalytic metal is often supported by a carrier made of such a composite oxide.

As with the oxygen-absorbing material, it is also known to employ alumina as an oxide carrier for supporting a catalytic metal. Alumina is known as an oxide carrier generally having a higher thermal resistance and a larger specific surface area than those of the oxygen-absorbing material. While alumina has no oxygen absorbing/releasing capability, it excels in being able to support a catalytic metal in a highly dispersed state. With a view to further increasing the specific surface area of alumina having the above properties, a technique of forming alumina to have a hollow structure is disclosed, for example, in Japanese Patent Laid-Open Publication Nos. 11-314035 and 2001-347167. Specifically, the Japanese Patent Laid-Open Publication No. 11-314035 discloses a technique of spraying a water/oil (W/O) emulsion solution comprising a primary component of aluminum (Al) and containing an element belonging to Groups IIa to VIIa and IIb in the periodic table, into a furnace chamber, and burning it therein at 900° C. or less to obtain an oxide carrier with a hollow structure having an outer diameter of 20 to 2000 nm and a shell thickness of several ten nm. The Japanese Patent Laid-Open Publication No. 2001-347167 discloses a technique of spraying a W/O emulsion solution comprising a primary component of Al and containing a rear-earth metal, and burning it at 1000° C. or less (preferably in the range of 650 to 950° C.) to obtain an oxide carrier with a hollow structure having an outer diameter of 20 to 2000 nm and a shell thickness of 50 nm or less.

As mentioned above, alumina has no oxygen absorbing/releasing capability. Thus, even if cerium (Ce) as rare earth metal is combined with alumina, a sufficient oxygen absorbing/releasing capability cannot be obtained. Form this point of view, the inventors conceived a CeZr composite oxide having a hollow structure without containing alumina. However, the CeZr composite oxide originally has a relatively small specific surface area and poor thermal resistance. Thus, even if the CeZr composite oxide is formed to have a hollow structure, the hollow structure will be destroyed after being exposed to heat of exhaust gas, to cause a problem about a significant decrease in specific surface area and a difficulty in ensuring adequate conversion performance.

SUMMARY OF THE INVENTION

In view of the above technical problem, it is an object of the present invention to provide an exhaust gas purifying catalyst capable of maintaining a hollow structure even after being exposed to high-temperature exhaust gas, to ensure an oxygen absorbing/releasing capability.

In order to achieve the above object, the present invention provides an exhaust gas purifying catalyst which comprises a honeycomb-shaped substrate, and a catalyst layer formed on a surface of the substrate. The catalyst layer contains a composite oxide which includes cerium (Ce) and zirconium (Zr) and has a hollow structure, and a catalytic metal supported by the composite oxide. The composite oxide having the hollow structure includes, in a state after being subjected to a thermal aging in Air at 1000° C. for 24 hours, a particle with a shape having an outer diameter of 750 to 1000 nm and a shell thickness of 80 to 120 nm.

In the exhaust gas purifying catalyst of the present invention, as compared with a CeZr-based composite oxide obtained through a spray pyrolysis process at 1000° C. or less, a CeZr-based composite oxide obtained through a spray pyrolysis process at 1000° C. or more is less likely to be sintered, and can be left as a larger shape to suppress aggregation and sinking of a noble metal. This makes it possible to maintain a light-off (warm-up) performance and a high-temperature conversion performance over a long period of time.

In addition, in the above exhaust gas purifying catalyst of the present invention, the composite oxide having the hollow structure may have, in a state before said thermal aging, a specific surface area of at least 80 m²/g. Furthermore, in the above exhaust gas purifying catalyst of the present invention, the composite oxide having the hollow structure may have, in the state after being subjected to said thermal aging, a specific surface area of at least 10 m² µg.

In the exhaust gas purifying catalyst, a decreasing rate of the specific surface area due to the thermal aging can be suppressed to maintain a light-off performance and a high-temperature conversion performance over a long period of time.

DETAILED DESCRIPTION OF THE PREFERRED EMBODIMENTS OF THE INVENTION

With reference to the accompanying drawings, an embodiment of the present invention will now be described.

[Formation Process for Composite Oxide]

Figure 1:
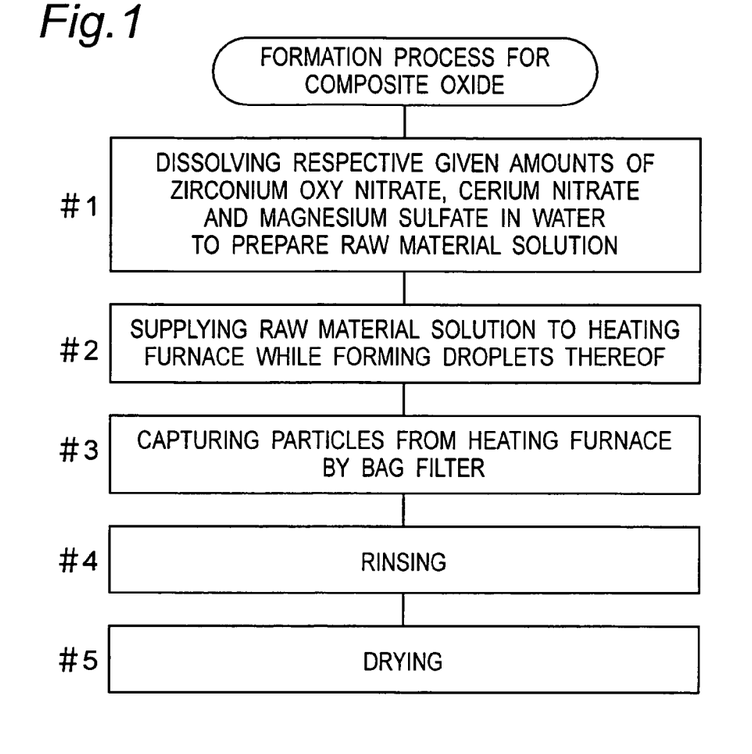
FIG. 1 is a flowchart showing a process of forming a composite oxide in an exhaust gas purifying catalyst according to one embodiment of the present invention.

Firstly, a process of forming a composite oxide having a hollow structure and serving as an oxygen absorbing material will be described. In this embodiment, a ceria-zirconia ($ZrO_2$—$CeO_2$) will be taken as one example of a composite oxide. In this embodiment, a spray pyrolysis process is used for forming a composite oxide with a hollow structure. Specifically, respective given amounts of zirconium oxy nitrate ($ZrO(NO_3)_2.2H_2O$), cerium nitrate ($Ce(NO_3)_3.6H_2O$) and magnesium sulfate ($MgSO_4.7H_2O$) are dissolved in water to prepare a zirconia-ceria raw material solution (#1). In this step, magnesium sulfate is selected from various additives as a material having a function of inducing a hollow structure while reducing a contact point between crystallites, and the content and concentration thereof may be arbitrarily determined.

Then, the raw material solution is supplied into a heating furnace, such as an electric tube furnace, while being sprayed using air as carrier gas and formed as droplets (#2). Subsequently, particles getting out of the heating furnace are captured by a bag filter (#3). The captured particles are rinsed with water (#4), and then dried (#5).

Through the above process, a zirconia-ceria composite oxide with a hollow structure is formed. The obtained zirconia-ceria composite oxide has a composition of $ZrO_2$/$CeO_2$=75/25 weight %.

[Preparation Process for Noble Metal-Doped Composite Oxide]

Figure 2:
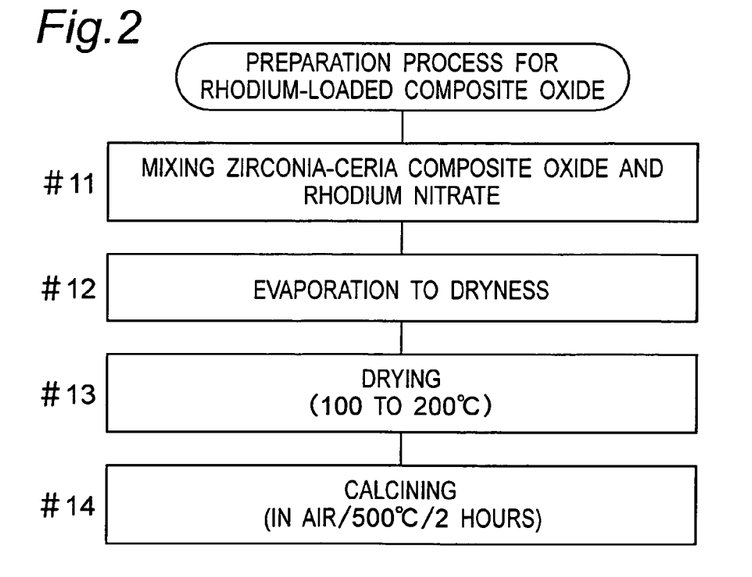
FIG. 2 is a flowchart showing a process of preparing a noble metal-doped composite oxide in the exhaust gas purifying catalyst

A process of preparing a noble metal-loaded composite oxide (e.g., rhodium (Rh)) will be described below. FIG. 2 is a flowchart showing the process of preparing the noble metal-loaded composite oxide.

In this process, the zirconia-ceria composite oxide with a hollow structure and a rhodium nitrate solution are mixed together in water (#11). Then, the mixture obtained in Step #11 is stirringly heated to evaporate water (evaporation to dryness) (#12). Thus, a rhodium (Rh)-loaded zirconia-ceria composite oxide is formed. Further, the composite oxide is dried at 100 to 200° C. (#13), and then calcined in Air at 500° C. for 2 hours (#14).

Through the above process, a powder-form rhodium-loaded zirconia-ceria composite oxide is prepared. In this embodiment, all samples are prepared such that an amount of rhodium in a Rh-loaded CeZr composite oxide to be finally obtained is set at 0.125 weight % relative to zirconia-ceria composite oxide.

[Production Process for Honeycomb-Supported Catalyst]

Figure 3:
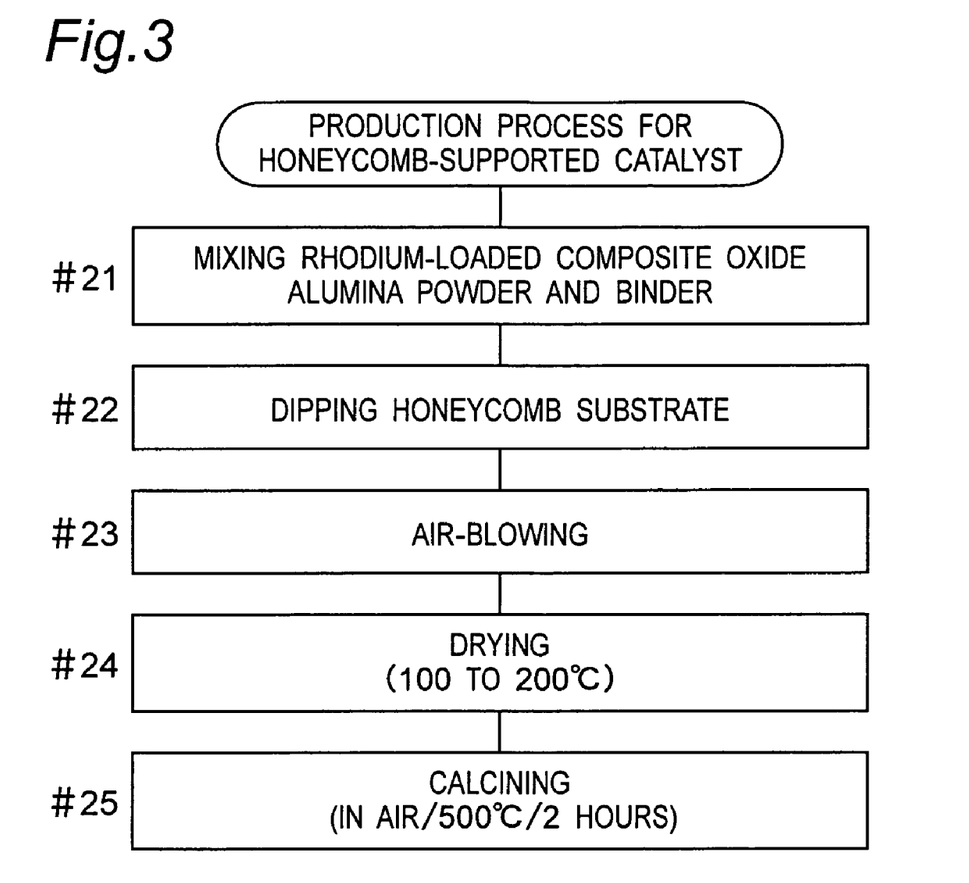
FIG. 3 is a flowchart showing a process of producing a honeycomb-supported catalyst for an evaluation on conversion performance.

FIG. 3 is a flowchart showing a production process for a honeycomb-supported catalyst. In this process, the Rh-loaded zirconia-ceria composite oxide prepared through the process described with reference to FIG. 2, an alumina ($Al_2O_3$) powder and a binder are mixed together in water (#21). Though this step, a slurry is formed. Then, a honeycomb substrate is dipped in the slurry (#22). Through this step, a catalytic layer was formed on a surface of the honeycomb substrate. Then, an excess slurry attached on the honeycomb substrate surface is blown by an air blower (#23). The steps #22 and #23 are repeated plural times to ensure a desired coating amount of the catalytic layer on the honeycomb substrate surface.

Subsequently, the sample is dried at 100 to 200° C. (#24), and then calcined in Air at 500° C. for 2 hours (#25).

Through the above process, a honeycomb-supported catalyst is produced. In this embodiment, the catalytic layer was coated on the honeycomb substrate surface to allow an amount of loaded rhodium to be set at 0.13 g per litter of the substrate in the honeycomb-supported catalyst to be finally obtained.

The inventors evaluated a light-off performance and a high-temperature conversion performance after a thermal aging in Air at 1000° C. for 24 hours, for three types of different honeycomb-supported catalysts produced through the above processes described with reference to FIGS. 1 and 3. The three honeycomb-supported catalysts are different from each other in that a temperature of the heating furnace in the step #2 in FIG. 1 is set, respectively, at 1100° C., 1200° C. and 950° C. In the following description, three types of composite oxides obtained by setting the temperature of the heating furnace in the step #2 in FIG. 1, respectively, at 1100° C., 1200° C. and 950° C., or three types of honeycomb-supported catalysts produced using the respective composite oxides, will be referred to respectively as Inventive Examples 1, Inventive Examples 2 and Comparative Example.

Figure 4:
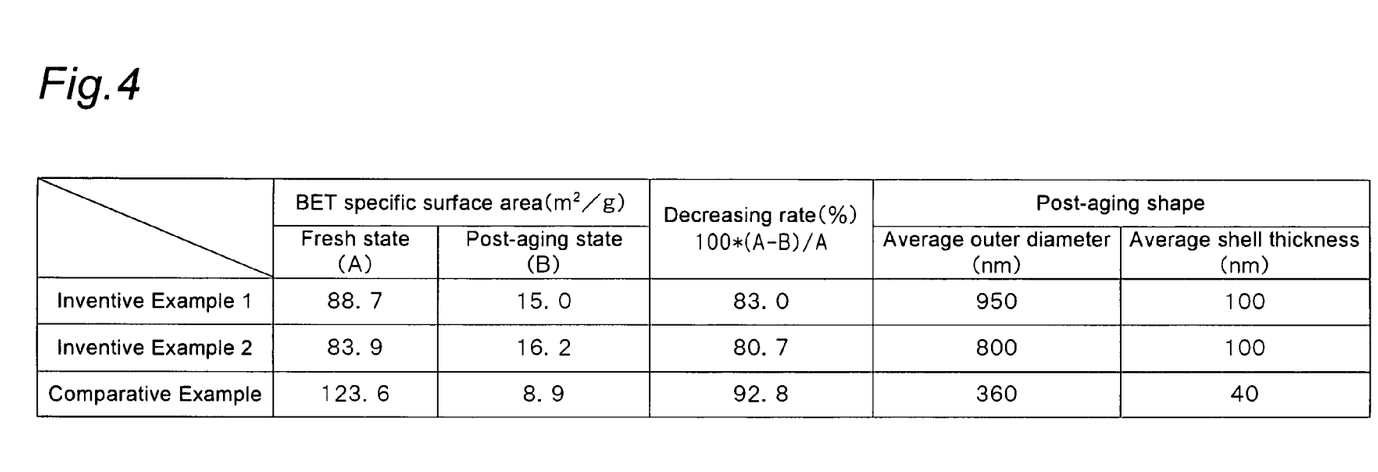
FIG. 4 is a table showing data about a BET specific surface area and a post-aging shape, in each of Inventive Examples 1, 2 and Comparative Example.
Figure 5:
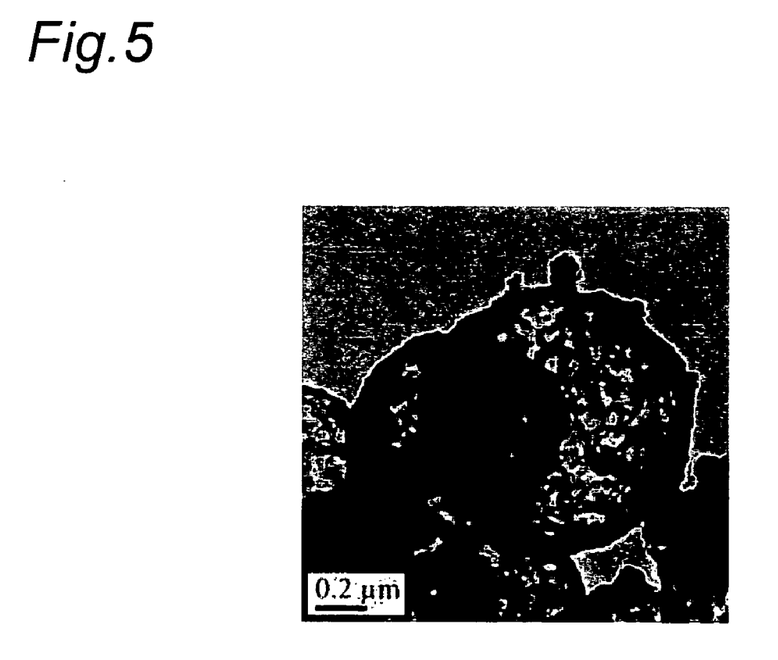
FIG. 5 is a photograph showing a post-aging composite oxide particle in Inventive Example 1.
Figure 6:
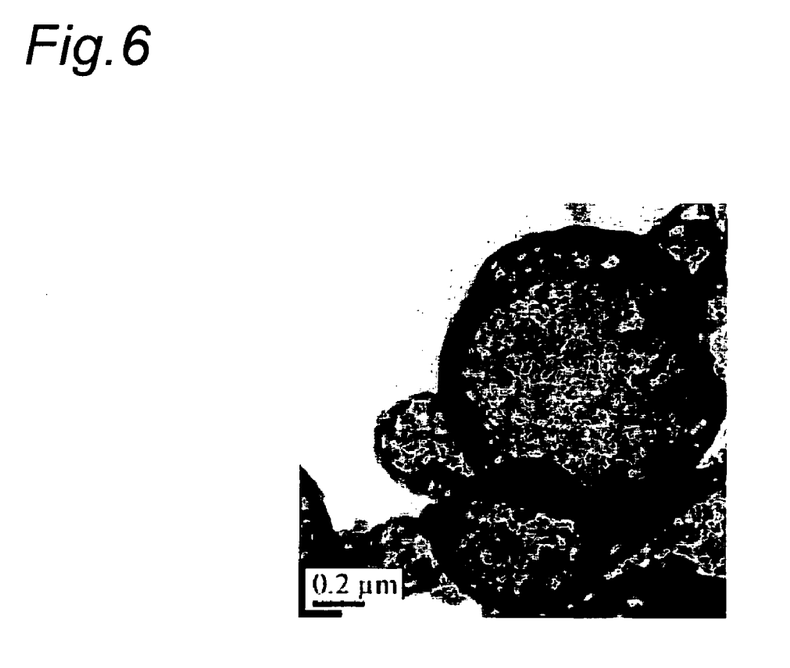
FIG. 6 is a photograph showing a post-aging composite oxide particle in Inventive Example 2.
Figure 7:
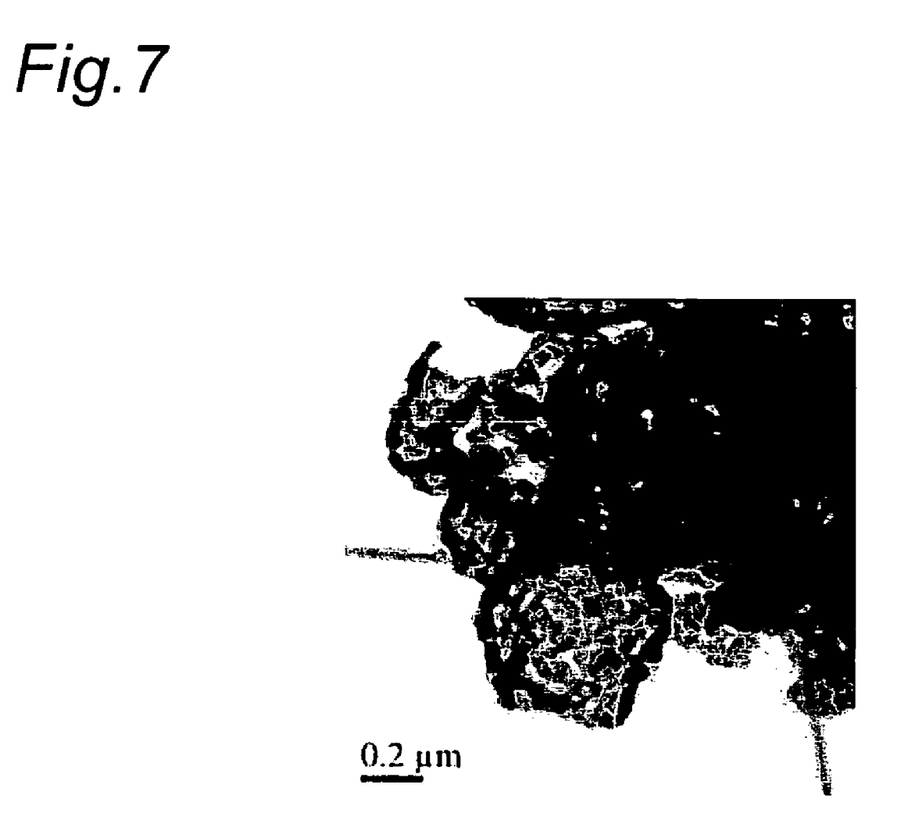
FIG. 7 is a photograph showing a post-aging composite oxide particle in Comparative Example.

Before describing a specific evaluation result, a table including data about pre-aging and post-aging BET specific surface areas and a post-aging shape in each of Inventive Examples 1, 2 and Comparative Example is shown in FIG. 4. In the table, a BET specific surface area in a fresh state means a BET specific surface area of a CeZr-based composite oxide on a honeycomb-supported catalyst surface before aging. Further, photographs of post-aging CeZr-based composite oxides on respective honeycomb-supported catalyst surfaces in Inventive Examples 1, 2 and Comparative Example are shown in FIGS. 5, 6 and 7. In addition, in the table of FIG. 4, "Average outer diameter" and "Average shell thickness" are obtained by taking TEM photographs at a plurality of view points, extracting twenty composite oxide particles at random from particles being present thereon, measuring outer diameter and shell thickness of each particle and calculating each average value.

As seen in the table, regarding each of Inventive Examples 1 and 2 obtained by setting the temperature of the heating furnace in the step #2 in FIG. 1, respectively, at 1100° C. and 1200° C., in the state after being subjected to the thermal aging in Air at 1000° C. for 24 hours, average outer diameter of Inventive Examples 1 and 2 are 950 nm and 800 nm, respectively, and both average shell thickness are 100 nm. As shown in FIGS. 5 and 6, almost of particles maintain hollow structure. On the other hand, regarding Comparative Example obtained by setting the temperature of the heating furnace in the step #2 in FIG. 1 at 950° C., in the state after the thermal history, average outer diameter is 360 nm and average shell thickness is 40 nm, that is, those values are less than those of Inventive Examples 1 and 2. In addition, regarding Comparative Example, the hollow structure of many particles appear to be out of shape. Accordingly, crystallographic signature of CeZr based composite oxide is significantly improved by setting the spray pyrolysis temperature (temperature of heating furnace) beyond 1000° C. As a result of it, it seems that heat resistance is improved, and thus the hollow structure is remained. In view of this fact and the fact in that when the temperature of heating furnace for Inventive Examples 1 and 2 are set to 1100° C. and 1200° C., respectively, average outer diameter of Inventive Examples 1 and 2 are 950 nm and 800 nm, respectively, and both average shell thickness are 100 nm, it can be said that it is preferable to include the particles in shape with outer diameter 750 to 1000 nm and shell thickness 80 to 120 nm in the state after the thermal aging at 1000° C. for 24 hours.

Furthermore, regarding a BET specific surface area, Inventive Examples 1 and 2 are of being obtained after calcining at 500° C. in step #25 of FIG. 3, that is, Inventive Examples 1 and 2 have the BET specific surface area above 80 $m^2/g$ in fresh state and have the BET specific surface area above 10 $m^2/g$, Inventive Examples 1 and 2 having 15 $m^2/g$ and 16.2 $m^2/g$, respectively, in state after the thermal aging in Air at 1000° C. for 24 hours. On the other hand, a BET specific surface area of Comparative Example is larger those of Inventive Examples 1 and 2 in fresh state, but becomes smaller to 8.9 $m^2/g$ after thermal history. That is, as seem from "Decreasing rate" in table of FIG. 4, the decreasing rate of Inventive Examples 1 and 2 is smaller that of Comparative Example by approximately 10%, and thus, it can be said that aggregation and sinking of a noble metal can be suppressed, that is, significant loss of purifying capability can be reduced.

[Evaluation on Conversion Performance]

In an evaluation on conversion performance, respective light-off temperatures T50 and conversion efficiency C400 about HC, CO and NOx emissions in each of Inventive Examples 1, 2 and Comparative Example were measured using a model-gas flow reactor and an exhaust emission analyzer. T50 means a gas temperature at an inlet of the catalyst at a time when a conversion rate reaches 50% in a course of gradually increasing a temperature of model gas supplied to the catalyst, from a room temperature. C400 means a conversion efficiency when an exhaust gas temperature at the catalyst inlet is 400° C.

In advance of the measurement for each of the honeycomb-supported catalysts, a pre-condition setting was performed to equalize measurement conditions. Specifically, after the aforementioned aging in Air at 1000° C. for 24 hours, each of the honeycomb-supported catalysts was placed in the model-gas flow reactor, and a model gas having a temperature of 600° C. and a theoretical air-fuel ratio (A/F=14.7) was supplied for 20 minutes. In the pre-condition setting, the model gas was set to have a space velocity (SV) of 120000/hour and a temperature rising speed of 30° C./min.

In T50 and C400 measurements after the precondition setting, the air-fuel ratio A/F of the model gas was set at 14.7±0.9. Specifically, mixed gas composed of $C_3H_6$: 555 ppm, CO: 0.6%, NO: 1000 ppm, $CO_2$: 13.9%, $H_2$: 0.2%, $O_2$: 0.6%, $H_2O$: 10 volume % was constantly supplied as a mainstream gas having an A/F of 14.7, and a given amount of variational gas was pulsedly added at a given frequency (1 Hz) to forcibly fluctuate the A/F at a magnitude of ±0.9. In the measurement, the model gas was set to have a space velocity (SV) of 60000/hour and a temperature rising speed of 30° C./min.

Figure 8:
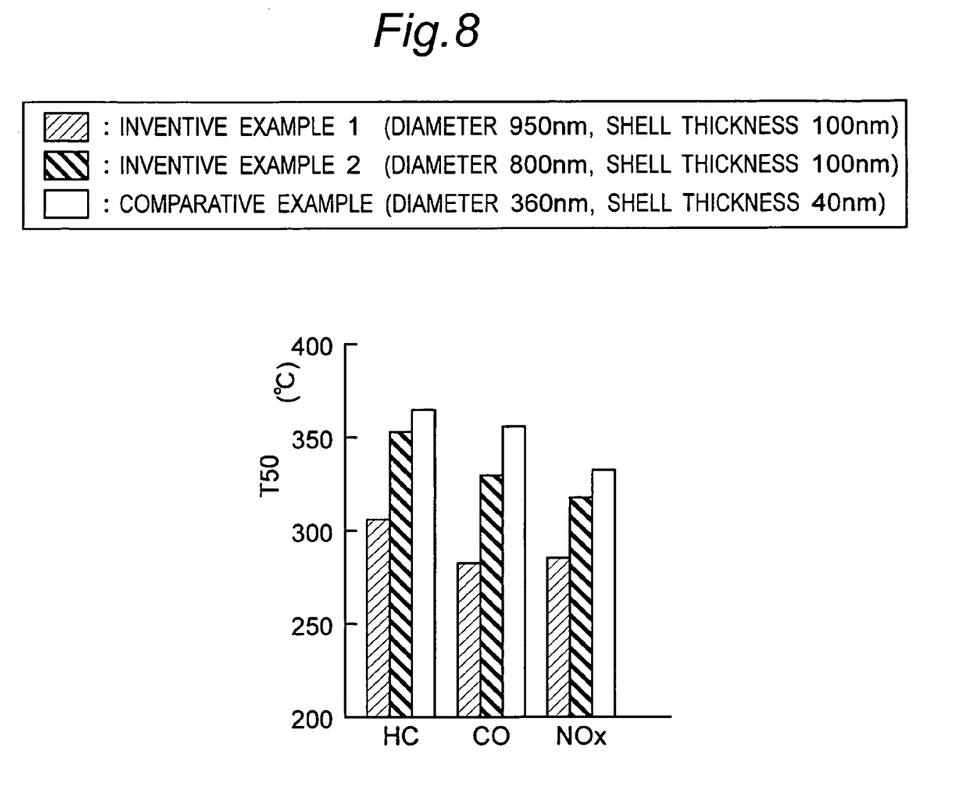
FIG. 8 is a graph showing the result on a measurement of a light-off temperature T50 in each of Inventive Examples 1, 2 and Comparative Example.
Figure 9:
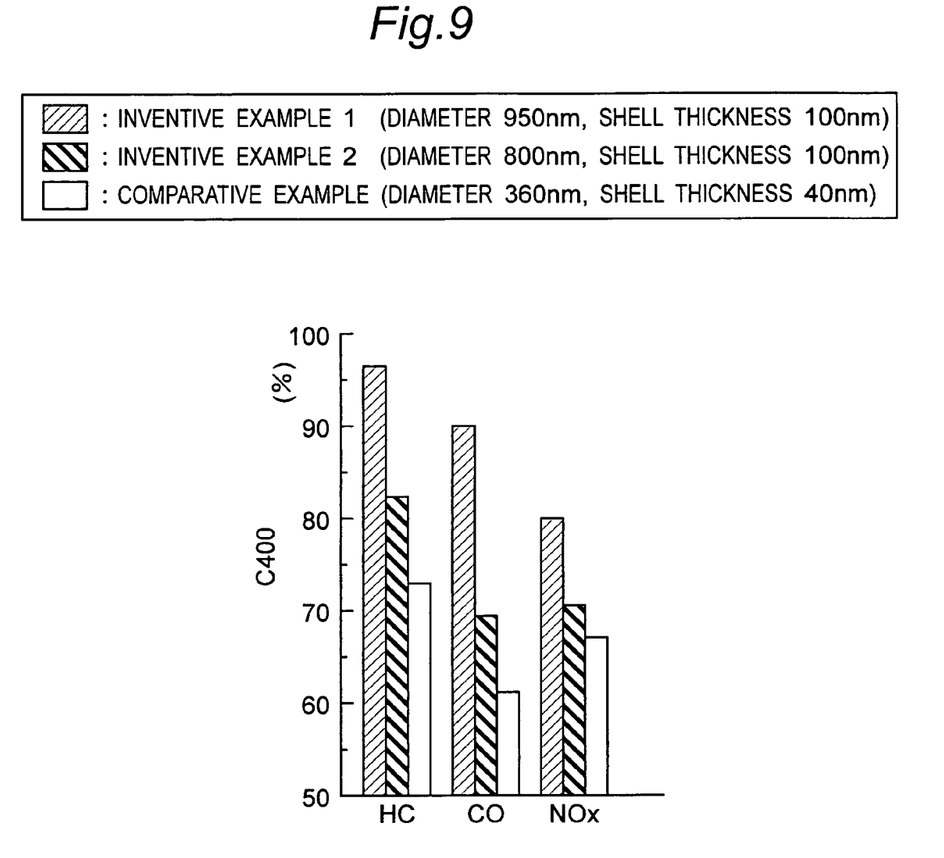
FIG. 9 is a graph showing the result on a measurement of a conversion at 400 (C400) in each of Inventive Examples 1, 2 and Comparative Example.

FIG. 8 shows the measurement result of light-off temperature T50. In each conversion of HC, CO and NOx emissions, T50 becomes higher (worse) stepwise in Inventive Example 1, Inventive Example and Comparative Example in this order. FIG. 9 shows the measurement result of conversion efficiency C400. In each conversion rate of HC, CO and NOx emissions, C400 becomes lower (worse) stepwise in Inventive Example 1, Inventive Example and Comparative Example in this order.

In view of the above results, Inventive Example 1, Inventive Example and Comparative Example have a better heat resistance in this order, and the light-off and conversion performances are more reliably maintained in this order.

As is clear from the above description, as compared with Comparative Example obtained through the spray pyrolysis process at less than 1000° C., each of Inventive Examples 1 and 2 obtained through the spray pyrolysis process at 1000° C. or more is hardly sintered, and can be left as a larger shape to suppress aggregation and sinking of a noble metal. This makes it possible to maintain a light-off performance and a high-temperature conversion performance over a long period of time.

It is understood that the present invention is not limited to the illustrated embodiment, but various modifications and changes in design may be made therein without departing from the spirit and scope of the present invention.

What is claimed is:

1. An exhaust gas purifying catalyst comprising:
   a honeycomb-shaped substrate; and
   a catalyst layer formed on a surface of said substrate, said catalyst layer containing a composite oxide composed of cerium (Ce) and zirconium (Zr) and has a hollow structure, and a catalytic metal supported by said composite oxide,
   wherein said composite oxide having the hollow structure includes, in a state after being subjected to a thermal aging in air at 1000° C. for 24 hours, a particle with a shape having an outer diameter of 750 to 1000 nm and a shell thickness of 80 to 120 nm.

2. The exhaust gas purifying catalyst as defined in claim 1, wherein said composite oxide having the hollow structure has, in the state after being subjected to said thermal aging, a specific surface area of at least 10 $m^2/g$.

3. The exhaust gas purifying catalyst as defined in claim 1 or 2, wherein said composite oxide having the hollow structure has, in a state before said thermal aging, a specific surface area of at least 80 $m^2/g$.

* * * * *